United States Patent [19]

Chen et al.

[11] Patent Number: 5,324,937
[45] Date of Patent: Jun. 28, 1994

[54] TARGET FOR CALIBRATING AND TESTING INFRARED DEVICES

[75] Inventors: Wallace W. Chen, La Palma; I-Fu Shih, Los Alamitos, both of Calif.

[73] Assignee: Hughes Aircraft Company, Los Angeles, Calif.

[21] Appl. No.: 10,125

[22] Filed: Jan. 21, 1993

[51] Int. Cl.$^5$ ............................................. G01D 18/00
[52] U.S. Cl. ................. 250/252.1; 250/338.1; 374/1; 374/2
[58] Field of Search ............... 250/252.1 A, 252.1 R, 250/330, 338.1, 493.1, 504 R; 374/1, 2; 29/458, 460

[56] References Cited

U.S. PATENT DOCUMENTS

| | | | |
|---|---|---|---|
| 3,986,384 | 10/1976 | Giorgi | 374/2 |
| 4,387,301 | 6/1983 | Wirick et al. | 250/252.1 |
| 4,480,372 | 11/1984 | Wirick et al. | 29/458 |
| 4,549,814 | 10/1985 | Creel et al. | 374/2 |

*Primary Examiner*—Constantine Hannaher
*Assistant Examiner*—Edward J. Glick
*Attorney, Agent, or Firm*—Wanda K. Denson-Low

[57] ABSTRACT

An improved target for testing and calibrating a detection device. The target (10) includes a metal substrate (12) with a first layer (14) of high emissivity material and a second layer (16) of low emissivity material are deposited thereon. In the specific implementation, the substrate (12) is copper, the first layer (14) is chromium-oxide and the second layer (16) is chrome. In the illustrative embodiment, an aperture (22) is drilled through the substrate (12) and the first and second layers (14, 16) thereon. An infrared emitter (20) is located at the aperture (22) to provide point source radiation. A conventional heater (26) is applied to the back surface of the target. A pattern is etched on second layer (16) on the front surface of the target using electron beam lithography. The use of a metal substrate (12) allows for the drilling of small holes more easily than in the conventional target. In addition, the metal substrate (12) provides good temperature uniformity without use of a separate metal plate due to the higher thermal conductivity of metal over glass. The elimination of the separate metal plate also simplifies target assembly and reduces target costs.

20 Claims, 1 Drawing Sheet

TARGET FOR CALIBRATING AND TESTING INFRARED DEVICES

BACKGROUND OF THE INVENTION

1. Field of the Invention

The present invention relates to test and measurement equipment. More specifically, the present invention relates to equipment used to test infrared equipment.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Infrared detection devices such as forward looking infrared (FLIR) devices detect heat energy in the form of infrared radiation emanating from an object. Optimal performance of these devices requires testing and calibration prior to use in the field. To minimize the test equipment required to project a temperature pattern for an infrared detection device, a target was developed by M. P. Wirick and J. P. Wright of Hughes Aircraft Company. As described in U.S. Pat. No. 4,387,301 issued Jun. 7, 1983, and entitled TARGET FOR CALIBRATING AND TESTING INFRARED DETECTION DEVICES, the teachings of which are incorporated herein by reference, this target minimized the amount of test equipment required to project a temperature differential across the surface of a test target. Instead of providing an actual temperature differential across the target, this device provided a target with differential emissivity. Hence, a temperature differential on the target is simulated for the device under test. The emissivity target makes it possible to design a compact, light-weight test unit not achievable with traditional blackbody sources.

The current target employs a glass substrate with a chrome coating. Selective etching of the chrome coating is effective to expose the glass substrate and thereby achieve a tuning of the differential emissivity across the face of the target.

Typical test patterns contain four-bar targets, reticles, and various small apertures. The four-bar targets are used for resolution tests; the reticles are used for aiming and alignment purposes; and, the small apertures are used for testing boresight, scale factors and crosstalks. In many cases, microfeatures that are not discernible by the FLIR are created inside of each bar of the four-bar target to provide a means of varying the average emissivity of the bar. The microfeatures are created by etching an array of small holes through the chrome layer.

For the demands of many current applications, i.e., missile seekers for tracking targets, complete and optimal testing of the device may require a point source at the target which radiates a modulated signal in the short wavelength infrared (0.9 to 1.3 microns) and the long wavelength infrared (8-12 micron) range.

In the conventional design, missile signals of short wavelengths are generated by placing a modulated infrared source behind the small aperture. However, a significant limitation of the conventional target design is its inability to provide a selective modulation for long-wavelength infrared sources. That is, since glass is opaque to long wavelength infrared radiation, to test at these frequencies, small apertures would need to be drilled through the glass substrate. However, since it is difficult to drill such precise holes in the glass substrate, undesirable methods such as electronic shuttering must be employed to simulate long wavelength modulation.

In the conventional design, the modulation of the long wavelength infrared energy can be achieved either by using a mechanical shutter in front of the target or by electronic shutter simulation built into the launcher interface circuit. Mechanical shutter approach can only be used where the target design is very simple and unwanted shuttering of adjacent target signals can be avoided. Although the electronic simulation of the shutter allows more complex target patterns, it will cause all target signals to be shuttered simultaneously. Under this condition, the missile tracker can lock on the designated target only if the target pattern has been carefully laid out such that the surrounding area of each aperture is clear and the missile track box encloses no other target. Such restriction imposed on target layout renders each target design unique to one weapon system. A universal target design essential for future test programs cannot be achieved using the electronic shutter simulation approach. The previous target design can only designate one target and thus cannot meet multiple-tracking test requirements.

Another disadvantage of the conventional target design is due to the difficulty in achieving high irradiance levels and uniformity due to the thickness of the glass substrate which precludes the illuminating source from being placed right behind the aperture. Since the aperture diameter is typically only one-tenth of the substrate thickness, the angular spread of the emitting energy from the aperture is severely limited. The limited angular spread, in turn, can cause irradiance uniformity problems unless the target alignment is tightly controlled using precision assembly fixtures at various stages of assembly build-up. To improve the angular spread, relay optics have to be used. This increases the optical complexity and cost of the target.

A further disadvantage of the conventional target design is the need for a metal plate behind the glass substrate to improve temperature uniformity due to inadequate thermal conductivity of glass. However, the metal plate adds to the fabrication, assembly, alignment and bonding costs of the device.

SUMMARY OF THE INVENTION

The need in the art is addressed by the present invention which provides an improved target for testing and calibrating a detection device. The inventive target includes a metal substrate with a first layer of high emissivity material and a second layer of low emissivity material deposited thereon. In a specific implementation, the substrate is copper, the first layer is chromium-oxide and the second layer is chrome. In the illustrative embodiment, an aperture is drilled through the substrate and the first and second layers thereon. An infrared emitter is located at the aperture to provide point source radiation. A conventional heater is applied to the back surface of the target as is common in the art. A pattern is etched on second layer on the front surface of the target using electron beam lithography. The use of a metal substrate allows for the drilling of small holes more easily than in the conventional target. In addition, the metal substrate provides good temperature uniformity without use of a separate metal plate due to the higher thermal conductivity of metal over glass. The elimination of the separate metal plate also simplifies target assembly and reduces target costs.

DESCRIPTION OF THE INVENTION

The invention is described below with reference to an illustrative embodiment to disclose the advantageous features thereof. Those skilled in the art will recognize additional applications and embodiments within the scope of the invention.

Figure 1:
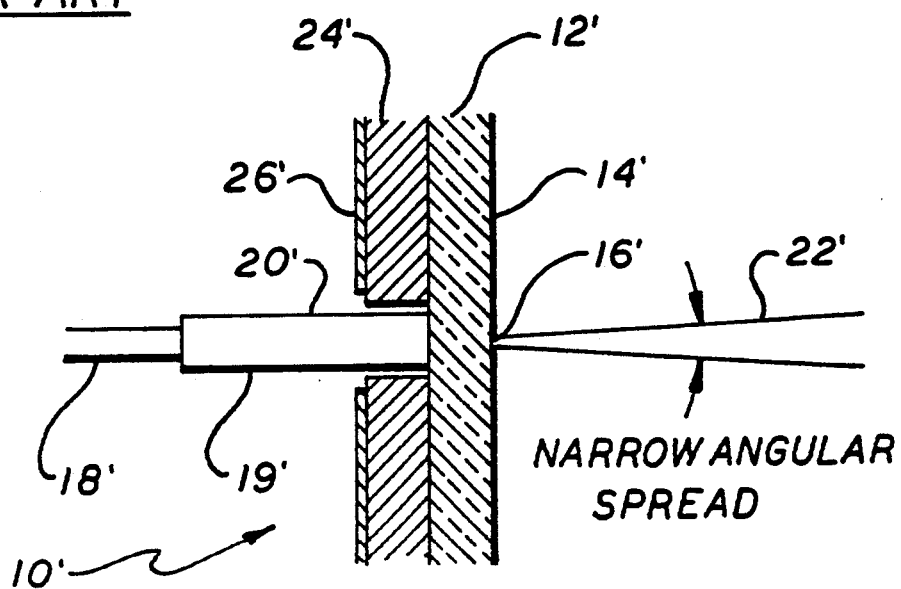
FIG. 1 is a simplified sectional side view of a conventional emissivity target i n accordance with conventional teachings.

FIG. 1 is a simplified sectional side view of a conventional emissivity target in accordance with conventional teachings. Thus, the target 10' includes a glass substrate 12' on which a metal coating 14' is deposited on the front surface thereof. A pattern is etched on tho metal coating to provide bars, reticles and small apertures of which one is depicted 16' When the target is equipped with a source 20' an output beam 22' may be provided. The source 20' includes an infrared emitter 18' and an optical fiber 19'. Note the narrow angular spread of the beam 22'. The limited angular spread is due to the requirement that the source be located distant from the front surface of the substrate 12'.

A metal plate 24' is mounted on the back surface of the substrate 12' for thermal uniformity. A heater pad 26' is disposed on the rear surface of the metal plate.

As discussed extensively above, there are numerous shortcomings associated with the use of the glass substrate. These shortcomings are substantially eliminated by the improved emissivity target of the present invention.

Figure 2:
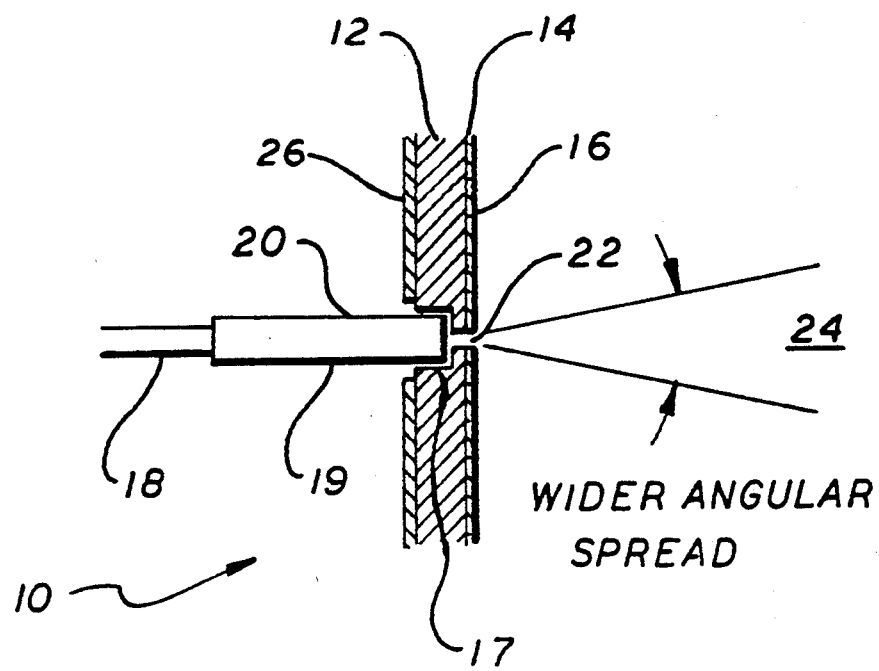
FIG. 2 is a simplified sectional side view of an illustrative implementation of an emissivity target designed in accordance with the present teachings.

FIG. 2 is a simplified sectional side view of an illustrative implementation of an emissivity target designed in accordance with the present teachings. The target 10 includes a substrate 12 fabricated of copper, molybdenum, or other suitable metal. A first layer 14 of high emissivity material is deposited on the front surface of the substrate 12. The first layer may be chromium-oxide or other suitable material. A second layer 16 of low emissivity material is deposited on the first layer 14. The second layer may be chrome or other suitable material.

The second layer 16 is selectively etched to expose the first layer using a suitable technique such as electron beam lithography to provide a desired test pattern. The average emissivity of target bars can be set to a value between the emissivity of chrome and chromium-oxide through proper design of microfeatures.

A heater pad 26 is applied directly to the substrate 12. Hence, it may be appreciated that one feature of the present design is in the elimination of the need for a metal plate to provide good thermal uniformity across the substrate.

A bore 17 is provided in the substrate 12 to allow for a close fit of a source 20 within the substrate 12 close to the front surface thereof. The source 20 includes an infrared emitter 18 and an optical fiber 19 as per the conventional design. A small aperture is drilled through the metal substrate 12 The aperture may be created by drilling fine holes or cutting fine lines through the substrate 12. The close fit of the source 20 and the aperture 22 allow for a generation of a beam 24 with a larger angular spread than that permitted by the conventional design without requiring relay optics.

Modulation of the source 20 can be achieved with mechanical shutters or electro-optical shuttering devices. When several wavelengths are required to emit from the same aperture, a fiber optic mixer or light pipe can be used to combine the radiation from different sources. Since the radiation from each aperture can be individually modulated, this invention provides a new capability for multiple-track testing.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. An improved target for testing and calibrating a detection device, comprising;
   a metal substrate;
   a first layer of high emissivity material formed on said metal substrate;
   a second layer of low emissivity coated on said first layer; and
   an aperture extending through said metal substrate, said first layer and said second layer.

2. The invention of claim 1 wherein said metal substrate is copper.

3. The invention of claim 2 wherein said first layer is chromium-oxide.

4. The invention of claim 3 wherein said second layer is chrome.

5. The invention of claim 1 wherein said metal substrate is molybdenum.

6. The invention of claim 1 wherein said first layer is chromium-oxide.

7. The invention of claim 1 wherein said second layer is chrome.

8. The invention of claim 1 wherein said aperture is aligned with a bore formed in said substrate and having a bore diameter, and said aperture has an aperture cross-sectional dimension which is smaller than said bore diameter.

9. An improved target for testing and calibrating a detection device comprising:
   a metal substrate;
   a first layer of high emissivity material on said metal substrate;
   a second layer of low emissivity coated on said first layer;
   said substrate having an aperture which extends through said first and second layers;
   a source of optical energy disposed to radiate optical energy through said aperture; and
   means for applying heat to said metal substrate.

10. The invention of claim 9 wherein said metal substrate is copper.

11. The invention of claim 10 wherein said first layer is chromium-oxide.

12. The invention of claim 11 wherein said second layer is chrome.

13. The invention of claim 9 wherein said source includes an optical fiber.

14. The invention of claim 13 wherein said source includes an emitter of infrared radiation.

15. The invention of claim 9 wherein said aperture is aligned with a bore formed in said substrate and having a bore diameter, and said aperture has an aperture cross-sectional dimension which is smaller than said bore diameter.

16. The invention of claim 15 wherein said source comprises an optical fiber having an end fitted into said bore.

17. An improved method of fabricating emissivity targets, including the steps of:
   depositing a first layer of high emissivity material on a metal substrate;
   depositing a second layer of low emissivity material on said first layer; and
   forming an aperture extending through said substrate and said first and second layers.

18. The invention of claim 17 wherein said step of forming an aperture comprises drilling said aperture through said substrate and said first and second layers thereon.

19. The invention of claim 17 wherein said aperture is aligned with a bore formed in said substrate and having a bore diameter, and said aperture has an aperture cross-sectional dimension which is smaller than said bore diameter.

20. The invention of claim 19 further comprising the step of inserting an end of an optical fiber into said bore.

* * * * *